United States Patent [19]
Kobilan

[11] 4,184,528
[45] Jan. 22, 1980

[54] BERRY AND FRUIT PICKING CONTAINER

[76] Inventor: Errol Kobilan, Rte. 1, Box 175, Elbert, Colo. 80106

[21] Appl. No.: 963,839

[22] Filed: Nov. 27, 1978

[51] Int. Cl.² .............................................. A01G 19/06
[52] U.S. Cl. ........................................ 150/2; 224/222
[58] Field of Search .............. 150/2; 56/329; 224/222, 224/219, 220, 221

[56] References Cited

U.S. PATENT DOCUMENTS

| | | | |
|---|---|---|---|
| 1,170,960 | 2/1916 | Canterbury | 150/2 |
| 1,184,628 | 5/1916 | Crowner | 150/2 |

FOREIGN PATENT DOCUMENTS 112311 10/1964 Czechoslovakia .......................... 150/2

Primary Examiner—Donald F. Norton
Attorney, Agent, or Firm—W. Britton Moore

[57] ABSTRACT

An arm attached berry and fruit picker's container includes a generally rectangular folded arm protective fabric webbing having spaced slots in the inner layer thereof and spaced arm encircling straps riveted to the ends thereof for connecting the webbing to the picker's arm so as to serve as a support for a tubular bag hemmed at its mouth end. A circular wire frame is removably arranged in the bag hem with one end being bent and the other end coiled and having an elongated depending extension with spaced oppositely disposed and laterally extending loops receivable in webbing slots which, together with mating fasteners on the webbing and bag, interconnect the bag and webbing and securely retain the bag on the picker's arm in position for berries to be dropped thereinto.

5 Claims, 7 Drawing Figures

U.S. Patent
Jan. 22, 1980
4,184,528
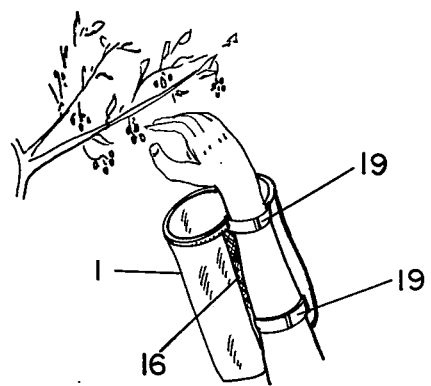
FIG. 1
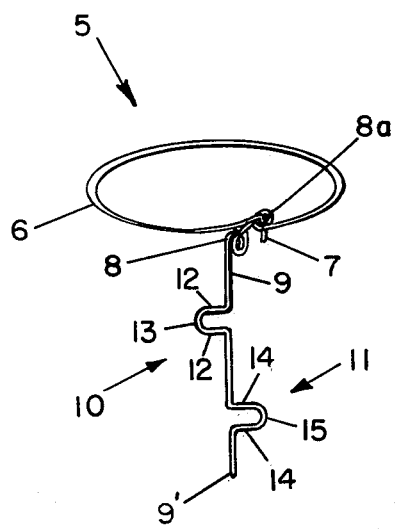
FIG. 2
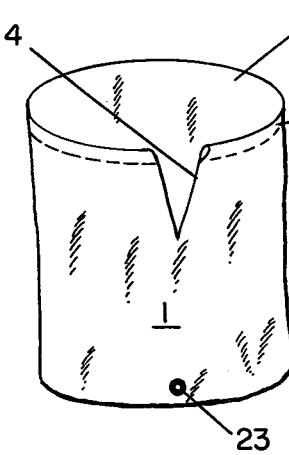
FIG. 3
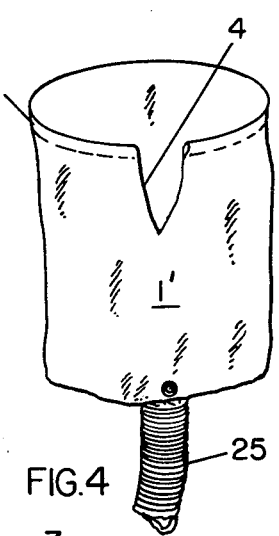
FIG. 4
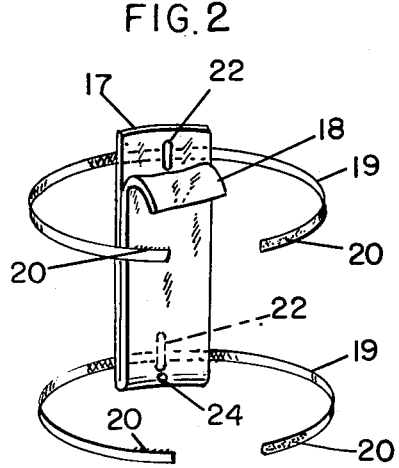
FIG. 5
FIG. 6
FIG. 7
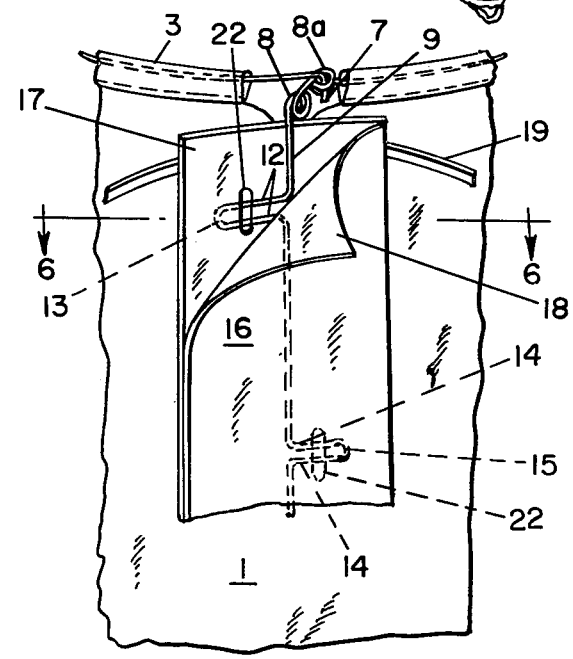

BERRY AND FRUIT PICKING CONTAINER

This invention relates to an arm attached berry and fruit picker's container for ready attachment to a protective webbing strap attached to the picker's arm.

While various fruit and berry gathering devices including containers attachable to the picker's arms or body have heretofore been proposed, such as, those of U.S. patents to Smith U.S. Pat. No. 852,082, Canterbury U.S. Pat. No. 1,170,960, Ricketts U.S. Pat. No. 1,600,566, and Arnold U.S. Pat. No. 1,978,877, the containers thereof have not been readily disconnected from the picker's arm and the latter tends to become irritated from the container attached thereto.

The principal object of the present invention is to provide an arm attached berry and fruit picker's container embodying a protective webbing engageable with and attachable by straps to an arm, and a tubular container hemmed at one end with a circular wire frame insertable in the hem and depending downwardly therefrom and formed with laterally and oppositely projecting loops removably interconnected with and for supporting the container on the webbing.

Another object is the provision of a generally rectangular folded protective fabric webbing with vertically disposed slots on its inner layer surface, and arm encircling straps insertable through spaced slots at opposing ends thereof for connecting the webbing to the picker's arm.

A further object is to provide a tubular berry receiving container having a hemmed mouth end, and a circular wire frame insertable through the bag hem and removably coiled and looped thereat and depending downwardly therefrom, with spaced laterally and oppositely projecting loops formed thereon for removable interengagement with the slots on the arm attached webbing.

Still another object is the provision of an arm attached folded protective arm webbing with vertically disposed, spaced, and offset slots on its outer surface for removably receiving the laterally projecting loops on the wire bag supporting frame therein, and with mating fasteners on the web and bag for additionally interconnecting the bag with the webbing.

A still further object is to provide a tubular berry receiving container having a hemmed mouth end with a circular wire frame insertable therethrough and depending therefrom with spaced loops thereon, and wherein flexible tubing is attached to the lower end thereof for the discharge therethrough of berries and fruit being picked.

These and other objects and advantages will be apparent as the specification is considered with the acompanying drawings, wherein FIG. 1 is a perspective view of the berry and fruit collecting container assembled on a picker's arm in the position assumed during picking;

FIG. 2 is a perspective view of the wire bag supporting frame;

FIG. 3 is a perspective view of the bag;

FIG. 4 is a perspective view of a modified form of bag with a discharge tube connected thereto and depending downwardly therefrom;

FIG. 5 is a perspective view of the bag supporting and wrist attachable and protecting webbing;

FIG. 6 is a section on the line 6—6 of FIG. 7; and

FIG. 7 is an enlarged view, partly broken away, of a section of the bag and supporting webbing, showing the interconnection between bag frame and webbing.

Referring more particularly to the drawings, wherein similar reference characters designate like parts throughout the several views, numeral 1 generally indicates a tubular flexible bag of any suitable material, such as fabric or plastic, which may be closed at its lower end, and with the upper mouth end 2 being hemmed at 3. The upper hemmed end has a V-cut 4 formed therein to provide access to the hems. Arranged within hem 3 and extending therethrough is the circular upper end 6 of a wire bag supporting frame 5. One end of the circular wire 6 projecting from the hem and into opening 4 is bent, as at 7, and the other projecting end is coiled and spacedly looped, as at 8 and 8A, and is then bent and projects downwardly to form a depending extension 9. Formed by bending at two spaced points on the extension 9 are integral loops 10 and 11, with the uppermost 10 extending laterally to the left, viewing FIG. 2, to provide a loop with two parallel horizontal legs 12 and a closed end 13. The lowermost loop 11 is spaced above the terminal end 9' and extends laterally to the right, viewing FIG. 2, and provides a similarly formed loop with two parallel horizontal legs 14 and a closed end 13, so that the loops are offset relative to each other, for a purpose presently to be described. It will be apparent that the upper circular wire end 6 is insertable through bag hem 3 and that bent end 7 thereof is extended through and connected to coiled wire loop 8A to retain the frame on the bag.

A wrist protecting and bag supporting webbing 16, of any suitable flexible material, such as fabric or plastic, is generally rectangular and flat in shape, and may be folded into inner and outer plies 17 and 18. Arm attaching straps 19, with conventional Velcro attaching strips or tabs 20 suitably secured to its opposing ends, may be connected to the webbing by mating snap fasteners, as best shown in FIG. 5, so as to encircle the picker's wrist and forearm, as in FIG. 1. Formed in outer webbing ply 18 are two spaced vertically extending slots 22, which are laterally offset with respect to each other so as to be alignable with and receive the wire loops 10 and 11, respectively, therethrough, when the bag is attached to the webbing. Thus, the depending wire extension 9 will be interposed between webbing plies 17 and 18 and the loops 10-11 will project outermost of webbing ply 18 so that the arm will be protected from the wire frame. Suitable mating snap fasteners 23 and 24 may also be suitably arranged on the opposing outer surfaces of bag 1 and the outer webbing ply 18 to further interconnect the two when it is desired to attach the bag thereto.

From the foregoing, it will be apparent that, with the wire bag supporting frame 5 arranged in hem 3 and depending downwardly therefrom, the upper and lower loops 10-11 will be aligned with webbing slots 22 any may be oppositely insertable through, as shown in FIG. 6, so as to vertically align the bag with and attach the same to the webbing. The snap fasteners 23-24 may then be interconnected to securely connect the bag to the webbing, after which the webbing may be arranged on and strapped to the picker's wrist and forearm. It will, of course, be understood that the bag may be readily emptied of its contents by downwardly tilting the arm, in an obvious manner. In addition, the bag may be readily disconnected from the webbing, with the latter remaining on the picker's arm, should picking be temporarily suspended.

In view of the bent, coiled and looped portion 8 on wire 6, the latter will be somewhat flexible so that the weight of the bag and fruit therein will be applied to the small coil thereof and function to distribute the weight on more wire and render the same less subject to breakage. The coiled loop 8A serves as a socket to connectably receive the bent end 7 of the wire.

A modified form of collecting bag is illustrated in FIG. 4, with the hemmed bag 1' thereof having a flexible tubing 25 suitably attached to its lower end and depending therefrom so that the bag contents will pass downwardly therethrough for discharge into another and larger container, not shown, suspended from the picker's waist or arranged on the ground. The tubing may be of any suitable material, such as, wire reinforced plastic. If desired, the lower end of the hemmed bag 1' may be open and hemmed to receive a draw string, neither of which is shown, and the open hemmed end may be slipped over the flared mouth end of a metal or plastic adapter, also not shown, formed on the upper end of tubing 25. This enables the tubing to be removably interconnected to bag 1' and permits ready attachment of the lower open end of the bag to the adapter and tubing, in an obvious manner, not shown.

While a preferred embodiment and modification has been shown and described, it is to be understood that various changes and improvements may be made therein, without departing from the scope and spirit of the appended claims.

What is claimed:

1. A berry and fruit arm attached collector comprising a flat protective fabric webbing spacedly slotted adjacent opposing ends, spaced arm encircling straps attachable to said webbing for encircling and attaching said webbing to a picker's forearm, a collecting bag having an open hemmed end, a circular wire supporting frame arranged in said hem and projecting therefrom, one end of said wire frame projecting from said hem being coiled and looped, and the other projecting end being bent for connection with said loop, and wire frame beyond said coil and loop being extended and depending downwardly of said bag, said depending wire extension being bent laterally at two spaced points to provide generally horizontal loops, said horizontal loops being insertable in said webbing slots whereby said wire bag supporting frame, bag and webbing are interconnected for assembly on the picker's forearm, and said depending wire extension is interposed in and covered by said webbing.

2. A berry and fruit arm attached collector, as defined in claim 1, wherein said webbing is folded with inner and outer plies with spaced vertical slots formed in the outermost ply thereof, and said horizontal wire loops are receivable therein.

3. A berry and fruit arm attached collector, as defined in claim 2, wherein wire frame horizontal loops project laterally in opposing directions and are offset with respect to each other, and said webbing slots are correspondingly spaced and offset so that said horizontal wire loops are receivable therein.

4. A berry and fruit arm attached collector, as defined in claim 1, wherein mating fasteners are formed on said webbing and bag for additionally interconnecting said webbing and bag.

5. A berry and fruit arm attached collector, as defined in claim 1, wherein said bag has a flexible discharge tubing attached to the lower end thereof so that the bag contents will pass downwardly therethrough.

* * * * *